United States Patent
Krishnan et al.

(10) Patent No.: US 12,182,029 B2
(45) Date of Patent: Dec. 31, 2024

(54) OPTIMAL DEPLOYMENT OF EMBEDDINGS TABLES ACROSS HETEROGENEOUS MEMORY ARCHITECTURE FOR HIGH-SPEED RECOMMENDATIONS INFERENCE

(71) Applicant: Tata Consultancy Services Limited, Mumbai (IN)

(72) Inventors: Ashwin Krishnan, Thane West (IN); Manoj Karunakaran Nambiar, Thane West (IN); Chinmay Narendra Mahajan, Pune (IN); Rekha Singhal, Thane West (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 6 days.

(21) Appl. No.: 18/455,890

(22) Filed: Aug. 25, 2023

(65) Prior Publication Data

US 2024/0119008 A1    Apr. 11, 2024

(30) Foreign Application Priority Data

Oct. 10, 2022    (IN) .............................. 202221057974

(51) Int. Cl.
*G06F 12/0897*    (2016.01)
*G06N 3/063*    (2023.01)

(52) U.S. Cl.
CPC .......... *G06F 12/0897* (2013.01); *G06N 3/063* (2013.01); *G06F 2212/1024* (2013.01)

(58) Field of Classification Search
CPC .......... G06F 12/0897; G06F 2212/1024; G06F 16/28; G06F 16/35; G06N 3/063; G06N 20/00
See application file for complete search history.

(56) References Cited

U.S. PATENT DOCUMENTS 7,506,297 B2    3/2009   Mukherjee et al.
2022/0284271 A1*  9/2022   Park ..................... G06F 11/3062
(Continued)

OTHER PUBLICATIONS

Pandey, Shailja, and Preeti Ranjan Panda. "NeuroMap: Efficient task mapping of deep neural networks for dynamic thermal management in high-bandwidth memory." IEEE Transactions on Computer-Aided Design of Integrated Circuits and Systems 41.11 (2022): 3602-3613. (Year: 2022).*

(Continued)

*Primary Examiner* — Francisco A Grullon
(74) *Attorney, Agent, or Firm* — Finnegan, Henderson, Farabow, Garrett & Dunner, LLP

(57) ABSTRACT

Works in the literature fail to leverage embedding access patterns and memory units' access/storage capabilities, which when combined can yield high-speed heterogeneous systems by dynamically re-organizing embedding tables partitions across hardware during inference. A method and system for optimal deployment of embeddings tables across heterogeneous memory architecture for high-speed recommendations inference is disclosed, which dynamically partitions and organizes embedding tables across fast memory architectures to reduce access time. Partitions are chosen to take advantage of the past access patterns of those tables to ensure that frequently accessed data is available in the fast memory most of the time. Partition and replication is used to co-optimize memory access time and resources. Dynamic organization of embedding tables changes location of embedding, hence needs an efficient mechanism to track if a required embedding is present in the fast memory with its current address for faster look-up, which is performed using spline-based learned index.

12 Claims, 5 Drawing Sheets

(56) References Cited

U.S. PATENT DOCUMENTS

2023/0342292 A1* 10/2023 Govindarajan ..... G06F 11/3037
2024/0028512 A1* 1/2024 Li ...................... G06F 12/0871

OTHER PUBLICATIONS

Jiang et al., "MicroRec: Efficient Recommendation Inference by Hardware and Data Structure Solutions," (2021).
Zhu et al., "Distributed Recommendation Inference on FPGA Clusters," (2021).

* cited by examiner

300 ⎯⎯⎯⎯ receiving, by an optimizer a plurality of input parameters comprising a (i) memory configuration of a heterogeneous memory architecture used by a recommender system during inference, the heterogenous memory architecture comprising a first level memory and a second level memory of a FPGA accelerator, and a CPU memory type, (ii) an access latency of each memory type of the heterogeneous memory architecture, (iii) a total number of tables in the recommender system, (iv) a plurality of embedding tables, (v) a CDF depicting number of queries satisfied by caching a plurality of records from the plurality of embedding tables, an input access pattern obtained from the CDF, and a table access pattern of each table from the total number of tables ⎯ 302

↓ obtaining, by the optimizer a latency model, an estimated memory utilization using one or more input parameters along with additional parameters ⎯ 304

↓ dynamically generating, by the optimizer, a final partition information and a final replication factor, from the latency model, the estimated memory utilization, and a plurality of constraints using an iterative process until latency described in the latency model is minimized ⎯ 306

↓ dynamically mapping each table partition of the final partition information to one of the first level memory and the second level memory by a heterogenous mapper executed by one or more hardware processors on receiving a shuffle signal triggered based on user requirement ⎯ 308

FIG. 3

|  |  | Table 1 | Table 2 | Table 3 | Table 4 | Table 5 | Table 6 | Table 7 | Table 8 |
|---|---|---|---|---|---|---|---|---|---|
|  | Total entries | 1.14e6 | 8.46e5 | 6.77e3 | 4.22e5 | 2.55e5 | 9.98e4 | 98 | 14 |
|  | # Dimension | 64 | 64 | 16 | 64 | 32 | 32 | 8 | 4 |
|  | Size (in MB) | 292.3 | 216.8 | 0.43 | 108.4 | 32.8 | 12.8 | $3.1 \times 10^{-3}$ | $2.24 \times 10^{-4}$ |
| DRAM | C.E.(%) | 10.64 | 6.76 | 51.10 | 10.49 | 21.27 | 36.52 | 70.41 | 85.71 |
|  | Est_banks$_{BI}$ | 320 | 192 | 8 | 192 | 128 | 96 | 4 | 2 |
|  | $C(X_{BI})*100$ (%) | 52.31 | 58.71 | 99.40 | 68.59 | 84.20 | 93.17 | 99.78 | 99.97 |
| HBM/DDR | C.E.(%) | 89.27 | 93.23 | 31.09 | 89.50 | 78.73 | 63.48 | 29.59 | 14.29 |
|  | Est_banks$_{FI}$ | 1 | 1 | 1 | 1 | 1 | 1 | 1 | 1 |
|  | $C(X_{FI})*100$ (%) | 99.996 | 100 | 99.987 | 100 | 100 | 100 | 100 | 100 |
| CPU | C.E.(%) | 0.09 | 0 | 17.81 | 0 | 0 | 0 | 0 | 0 |
|  | $C(X_{CI})*100$ (%) | $3.93 \times 10^{-3}$ | 0.0 | $1.23 \times 10^{-2}$ | 0.0 | 0.0 | 0.0 | 0.0 | 0.0 |

C.E. - cached entries

FIG. 5

OPTIMAL DEPLOYMENT OF EMBEDDINGS TABLES ACROSS HETEROGENEOUS MEMORY ARCHITECTURE FOR HIGH-SPEED RECOMMENDATIONS INFERENCE

PRIORITY CLAIM

This U.S. patent application claims priority under 35 U.S.C. § 119 to: India Application No. 202221057974, filed on Oct. 10, 2022. The entire contents of the aforementioned application are incorporated herein by reference.

TECHNICAL FIELD

The embodiments herein generally relate to the field of Recommendation Models (RMs) and, more particularly, to a method and system for optimal deployment of embeddings tables across heterogeneous memory architecture for high-speed recommendations inference by the RMs.

BACKGROUND

In current retail industry, deep learning based personalized recommendation systems or Recommendation Models (RMs) are popular that recommend products based on customer needs and other factors are widely used. Approach of most of the recommendation systems to analyze customer details and browsing behavior (past products clicked) to find the probability of the customer clicking on a certain product recommendation (also referred to as Click-through rate (CTR). The recommendation engines of the recommendation systems must scan large number of products in a limited time frame (SLA). Higher the products scanned, better is the quality of recommendation. Use of Deep Neural Network (DNN) based models for recommendations (e.g., products, videos, tweets, and posts) in enterprise applications has been increasing. In DNN based approach, any discrete entity such as each user, movie etc., is represented to a continuous space through embeddings, which are vector representations of an entity. Each item in the vector represents a feature or a combination of features for that entity. Recommendation Models (RMs) are known for their extensive use of embedding tables to evaluate the probability of a product being clicked. Embedding tables are composed of tens to billions of latent embedding vectors. Typically, few tens to hundreds of embedding tables are present depending on the type of the model used with varying embedding dimensions. Embedding access is the main performance bottleneck in RMs due to their large size and the randomness in the way they are looked up.

Embedding access time largely depends on their access patterns that includes number of embedding lookups per table in a single recommendation that has large variations depending on the architecture of the recommendation model. The products or items scanned is limited by embedding tables. These embedding tables are large and randomly accessed, therefore slow due to the limited memory. By increasing the average speed of access from an embedding table, one could thereby increase quality and improve customer retention/conversion improving the bottom line of the business.

Existing deployments of recommendation models require huge amounts of memory and are restricted in recommendations scanned per second due to the Service Level Agreement (SLA). Many different techniques have evolved to increase the recommendation scanned, like training a smaller model or deploying the model on a GPU or perform static placement of embeddings across Field Programmable Gate Array (FPGA) memories. But these techniques are either compromising in the quality of the output or limited by memory of GPU and FPGA. Literature indicates challenges in high-performance deployments of RMs arising out of memory-bound nature [6, 10, 11]. The state-of-the-art, focused on performance optimized deployment of RMs, but lack explorations in heterogeneous memory architecture domain to leverage optimal partitioning and dynamic deployment by analyzing workload during inference. The current state-of-the-art considers static placement of the embedding tables, which may not be optimal since input access pattern changes with time during inference. Further, all embedding tables need to be accessed for an inference and the inference time is be bounded by the slowest access.

SUMMARY

Embodiments of the present disclosure present technological improvements as solutions to one or more of the above-mentioned technical problems recognized by the inventors in conventional systems.

For example, in one embodiment, a method for high speed recommendations is provided.

The method includes receiving, by an optimizer executed by one or more hardware processors, a plurality of input parameters comprising (i) a memory configuration of a heterogeneous memory architecture used by a Recommendation Model (RM) during inference, the heterogenous memory architecture comprising a first level memory and a second level memory of a Field Programmable Gate Array (FPGA) accelerator, and a CPU memory type, (ii) an access latency of each memory type of the heterogeneous memory architecture, (iii) a total number of tables in the RM, (iv) a plurality of embedding tables, (v) a Cumulative Distributive Function (CDF) depicting probability distribution of queries satisfied by caching a plurality of records from the plurality of embedding tables, (vi) an input access pattern obtained from the CDF, and (vii) a table access pattern of each table from the total number of tables;

Further, the method includes obtaining, by the optimizer: (a) an estimated memory utilization for (i) a number of records cached in the first level memory and the second level memory, and (ii) a plurality of parameters of a learned indices technique stored in one of memory sub-types not used for caching embeddings in the first level memory used for addressing the plurality of records cached in the first level memory and the second level memory; and (b) a latency model for each memory type using the CDF, the input access pattern, the table access pattern, the access latency of each memory type, a replication factor indicating number of times a record among the plurality of records is replicated in the first level memory and the second level memory for multiple parallel access an initial partition information (table partition, memory type) indicating number of records from each of the plurality of embedding tables being cached in each memory type, and a number of round trips to each memory unit of the second level memory.

Further, the method includes dynamically generating, by the optimizer executed by the one or more hardware processors, a final partition information and a final replication factor, from the latency model, the estimated memory utilization, and a plurality of constraints using an iterative process until latency described in the latency model is minimized, wherein the plurality of constraints: (a) ensure estimated memory utilization, for the first level memory is within an available memory capacity of first level memory received in the memory configuration, for the second level memory is such that top k largest table partitions among a plurality of sorted table partitions generated during the estimation of round trips to each memory unit of the second level memory is within the capacity of a largest memory sub-type with k memory units in the second level memory, and for the second level memory such that non-top k largest table partitions among the plurality of sorted table partitions are within the capacity of memories other than the largest memory sub-type in the second level memory. (b) Restrict the number of round trips to each memory unit of the first level memory used for caching embeddings to 'one' to avoid partition of multiple embedding tables on a single memory unit among a plurality of memory units within the first level memory used for caching embeddings. (c) Restrict estimated memory utilization by the learned indices technique is within the capacity of one of the memory sub-types not used for caching embeddings in the first level memory. (d) Ensure non-cached records are pushed to the CPU memory.

Furthermore, the method includes dynamically mapping each table partition of the final partition information to one of the first level memory and the second level memory by a heterogenous mapper executed by the one or more hardware processors on receiving a shuffle signal triggered due to change in the input access pattern, wherein the mapping defines an approach to cache the plurality of records into the first level memory and the second level memory, and wherein the mapping comprises: (a) each table partition of the final partition information to a memory unit of the first level memory using final replication factor of first level memory, an embedding record dimension of each of the plurality of embedding tables, a width and a size of the memory unit of the first level memory received in the memory configuration, wherein the width refers to number of bits that can be stored in a single row of memory unit of the first level memory, and (b) each table partition of the final partition information to a memory unit of the second level memory based on the final replication factor of the second level memory and round trips to each memory unit of the second level memory.

In another aspect, a system for high speed recommendations is provided. The system comprises a memory storing instructions; one or more Input/Output (I/O) interfaces; and one or more hardware processors coupled to the memory via the one or more I/O interfaces, wherein the one or more hardware processors are configured by the instructions to receive, by an optimizer executed by one or more hardware processors, a plurality of input parameters comprising (i) a memory configuration of a heterogeneous memory architecture used by a Recommendation Model (RM) during inference, the heterogenous memory architecture comprising a first level memory and a second level memory of a Field Programmable Gate Array (FPGA) accelerator, and a CPU memory type, (ii) an access latency of each memory type of the heterogeneous memory architecture, (iii) a total number of tables in the RM, (iv) a plurality of embedding tables, (v) a Cumulative Distributive Function (CDF) depicting probability distribution of queries satisfied by caching a plurality of records from the plurality of embedding tables, (vi) an input access pattern obtained from the CDF, and (vii) a table access pattern of each table from the total number of tables.

Further, the one or more hardware processor is configured to obtain, by the optimizer: (a) an estimated memory utilization for (i) a number of records cached in the first level memory and the second level memory, and (ii) a plurality of parameters of a learned indices technique stored in one of memory sub-types not used for caching embeddings in the first level memory used for addressing the plurality of records cached in the first level memory and the second level memory; and (b) a latency model for each memory type using the CDF, the input access pattern, the table access pattern, the access latency of each memory type, a replication factor indicating number of times a record among the plurality of records is replicated in the first level memory and the second level memory for multiple parallel access; an initial partition information (table partition, memory type) indicating number of records from each of the plurality of embedding tables being cached in each memory type, and a number of round trips to each memory unit of the second level memory.

Further, the one or more hardware processor is configured to dynamically generate, by the optimizer executed by the one or more hardware processors, a final partition information and a final replication factor, from the latency model, the estimated memory utilization, and a plurality of constraints using an iterative process until latency described in the latency model is minimized, wherein the plurality of constraints: (a) ensure estimated memory utilization, for the first level memory is within an available memory capacity of first level memory received in the memory configuration, for the second level memory is such that top k largest table partitions among a plurality of sorted table partitions generated during the estimation of round trips to each memory unit of the second level memory is within the capacity of a largest memory sub-type with k memory units in the second level memory, and for the second level memory such that non-top k largest table partitions among the plurality of sorted table partitions are within the capacity of memories other than the largest memory sub-type in the second level memory. (b) Restrict the number of round trips to each memory unit of the first level memory used for caching embeddings to 'one' to avoid partition of multiple embedding tables on a single memory unit among a plurality of memory units within the first level memory used for caching embeddings. (c) Restrict estimated memory utilization by the learned indices technique is within the capacity of one of the memory sub-types not used for caching embeddings in the first level memory. (d) Ensure non-cached records are pushed to the CPU memory.

Furthermore, the one or more hardware processor is configured to dynamically map each table partition of the final partition information to one of the first level memory and the second level memory by a heterogenous mapper executed by the one or more hardware processors on receiving a shuffle signal triggered due to change in the input access pattern, wherein the mapping defines an approach to cache the plurality of records into the first level memory and the second level memory, and wherein the mapping comprises: (a) each table partition of the final partition information to a memory unit of the first level memory using final replication factor of first level memory, an embedding record dimension of each of the plurality of embedding tables, a width and a size of the memory unit of the first level memory received in the memory configuration, wherein the width refers to number of bits that can be stored in a single row of memory unit of the first level memory, and (b) each table partition of the final partition information to a memory unit of the second level memory based on the final replication factor of the second level memory and round trips to each memory unit of the second level memory.

In yet another aspect, there are provided one or more non-transitory machine-readable information storage mediums comprising one or more instructions, which when executed by one or more hardware processors causes a method for high speed recommendations. The method includes receiving, by an optimizer executed by one or more hardware processors, a plurality of input parameters comprising (i) a memory configuration of a heterogeneous memory architecture used by a Recommendation Model (RM) during inference, the heterogenous memory architecture comprising a first level memory and a second level memory of a Field Programmable Gate Array (FPGA) accelerator, and a CPU memory type, (ii) an access latency of each memory type of the heterogeneous memory architecture, (iii) a total number of tables in the RM, (iv) a plurality of embedding tables, (v) a Cumulative Distributive Function (CDF) depicting probability distribution of queries satisfied by caching a plurality of records from the plurality of embedding tables, (vi) an input access pattern obtained from the CDF, and (vii) a table access pattern of each table from the total number of tables;

Further, the method includes obtaining, by the optimizer: (a) an estimated memory utilization for (i) a number of records cached in the first level memory and the second level memory, and (ii) a plurality of parameters of a learned indices technique stored in one of memory sub-types not used for caching embeddings in the first level memory used for addressing the plurality of records cached in the first level memory and the second level memory; and (b) a latency model for each memory type using the CDF, the input access pattern, the table access pattern, the access latency of each memory type, a replication factor indicating number of times a record among the plurality of records is replicated in the first level memory and the second level memory for multiple parallel access an initial partition information (table partition, memory type) indicating number of records from each of the plurality of embedding tables being cached in each memory type, and a number of round trips to each memory unit of the second level memory.

Further, the method includes dynamically generating, by the optimizer executed by the one or more hardware processors, a final partition information and a final replication factor, from the latency model, the estimated memory utilization, and a plurality of constraints using an iterative process until latency described in the latency model is minimized, wherein the plurality of constraints: (a) ensure estimated memory utilization, for the first level memory is within an available memory capacity of first level memory received in the memory configuration, for the second level memory is such that top k largest table partitions among a plurality of sorted table partitions generated during the estimation of round trips to each memory unit of the second level memory is within the capacity of a largest memory sub-type with k memory units in the second level memory, and for the second level memory such that non-top k largest table partitions among the plurality of sorted table partitions are within the capacity of memories other than the largest memory sub-type in the second level memory. (b) Restrict the number of round trips to each memory unit of the first level memory used for caching embeddings to 'one' to avoid partition of multiple embedding tables on a single memory unit among a plurality of memory units within the first level memory used for caching embeddings. (c) Restrict estimated memory utilization by the learned indices technique is within the capacity of one of the memory sub-types not used for caching embeddings in the first level memory. (d) Ensure non-cached records are pushed to the CPU memory.

Furthermore, the method includes dynamically mapping each table partition of the final partition information to one of the first level memory and the second level memory by a heterogenous mapper executed by the one or more hardware processors on receiving a shuffle signal triggered due to change in the input access pattern, wherein the mapping defines an approach to cache the plurality of records into the first level memory and the second level memory, and wherein the mapping comprises: (a) each table partition of the final partition information to a memory unit of the first level memory using final replication factor of first level memory, an embedding record dimension of each of the plurality of embedding tables, a width and a size of the memory unit of the first level memory received in the memory configuration, wherein the width refers to number of bits that can be stored in a single row of memory unit of the first level memory, and (b) each table partition of the final partition information to a memory unit of the second level memory based on the final replication factor of the second level memory and round trips to each memory unit of the second level memory.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3 is a flow diagram illustrating a method for optimal deployment of embeddings tables across heterogeneous memory architecture for high-speed recommendations inference, using the system of FIG. 1, in accordance with some embodiments of the present disclosure.

FIG. 5 illustrates system output depicting table partitions across memory units for heterogeneous implementation using one-Field Programmable Gate Array (FPGA), in accordance with some embodiments of the present disclosure.

Figure 1:
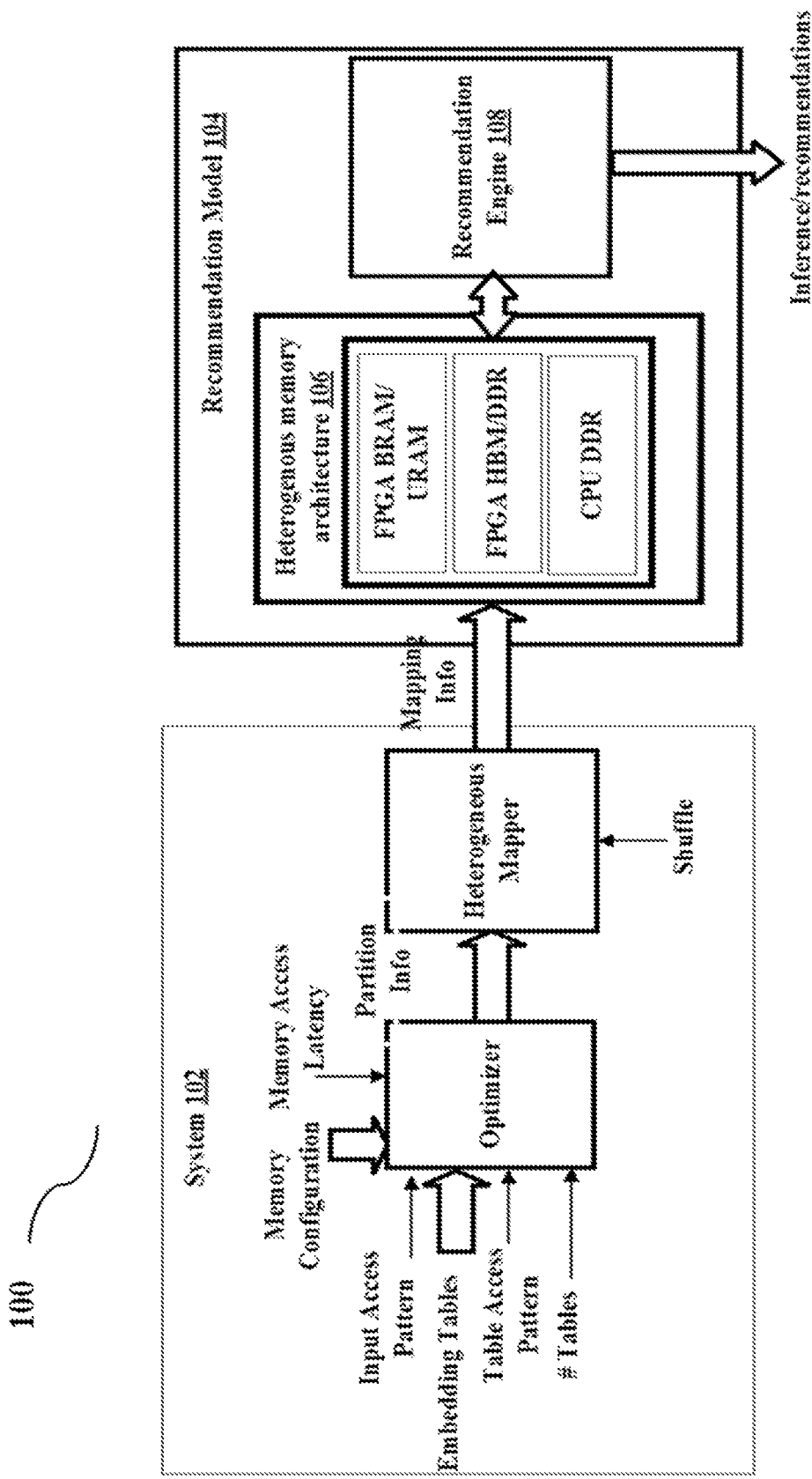
FIG. 1 is a schematic depicting a system for enhancing performance of a Recommendation Model with optimal deployment of embedding tables across heterogeneous memory architecture for high-speed recommendations inference, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Recently, a lot of work has been done to accelerate the embedding fetch operation of the Recommendation Models. One of the work in literature presents caching approach for hot embeddings on GPU to accelerate embedding fetch operation during training while another work in the literature performs static placement of embeddings across different memory hierarchies (GPU HBM, CPU DDR, and SSD) based on their access pattern to speed. The approach implemented in the above works is to pre-process the entire training set once and place the most frequent embeddings on or near GPU for faster embedding access. However, during inference, the access pattern would change with time, hence the cache needs to be updated and be dynamic with change in access-pattern for optimal deployment of embedding tables. This technical limitation is not addressed by state of the art techniques, and still remains an unresolved problem.

Yet another work is a near data processing-based SSD memory system customized for neural recommendation inference that reduces end-to-end model inference latency by 2× compared to using COTS SSDs, While another existing approach builds an inference scheduler and custom accelerator that decomposes models into multi-stage pipelines and performs optimal placement of embedding tables statically. Furthermore, an existing method presents an approach of using near memory (in-memory) architectures to reduce access time for embeddings. However, it would take years to deploy such DRAM chips in production.

More recently, works like *MicroRec: Efficient Recommendation Inference by Hardware and Data Structure Solutions*. by Wenqi Jiang et. al, and *FleetRec: Large-Scale Recommendation Inference on Hybrid GPU-FPGA Clusters* by Wenqi Jiang et. al have used Field Programmable Gate Arrays (FPGAs) to speed-up the inference by leveraging the High Bandwidth Memories (HBMs). MicroRec presents high speed embedding look-up operation using HBMs available on FPGAs. However, their architecture is limited to models with total embedding size of up to 40 GB (total space available in HBM+ Dual-Data Rate (DDR)). FleetRec overcame this issue by arranging the embedding tables along a cluster of FPGAs and CPUs connected by 100 Gbps TCP/IP network. In FleetRec, larger embedding tables are stored in CPU. Although MicroRec and FleetRec provides a technique to distribute embeddings along BRAMs, DDR, and HBMs, the larger tables are put into CPU missing out the opportunity to store the hot embeddings on to the faster memories: Block Random Access Memory (BRAM) and HBM/DDR. There is neither automation involved to distribute these tables along different memory types nor any optimization to limit the number of visits to slower memory. Here, for every inference, there is a mandatory look-up from the slower memory. Overall, these works in the literature do not leverage the embedding access patterns and memory units' access/storage capabilities that when combined can yield high-speed heterogeneous systems by dynamically re-organizing embedding tables partitions across hardware during inference.

Embodiments of the present disclosure provide a method and system for optimal deployment of embeddings tables across heterogeneous memory architecture for high-speed recommendations inference. The method disclosed dynamically partitions and organizes embedding tables across fast memory architectures to reduce access time for embedding tables. The partitions are chosen to take advantage of the past access patterns of those tables to ensure that frequently accessed data is available in the fast memory most of the time. The partition and replication is used to co-optimize memory access time and resources. The dynamic organization of embedding tables changes location of embedding, hence needs an efficient mechanism to locate and track if a required embedding is present in the fast memory with its current address for faster look-up. Thus, the method leverages spline-based learned index, Radix spline, known in the art, to ensure faster index retrieval.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

FIG. 1 is a schematic 100, depicting a system 102 for enhancing performance of a Recommendation Model (RM) 104 with optimal deployment of embeddings tables across heterogeneous memory architecture for high-speed recommendations inference, in accordance with some embodiments of the present disclosure. The RM 104 is supported by the system 102 for providing optimal deployment of embeddings tables across a heterogeneous memory architecture 106 for high-speed recommendations inference of the RM 104.

Figure 2:
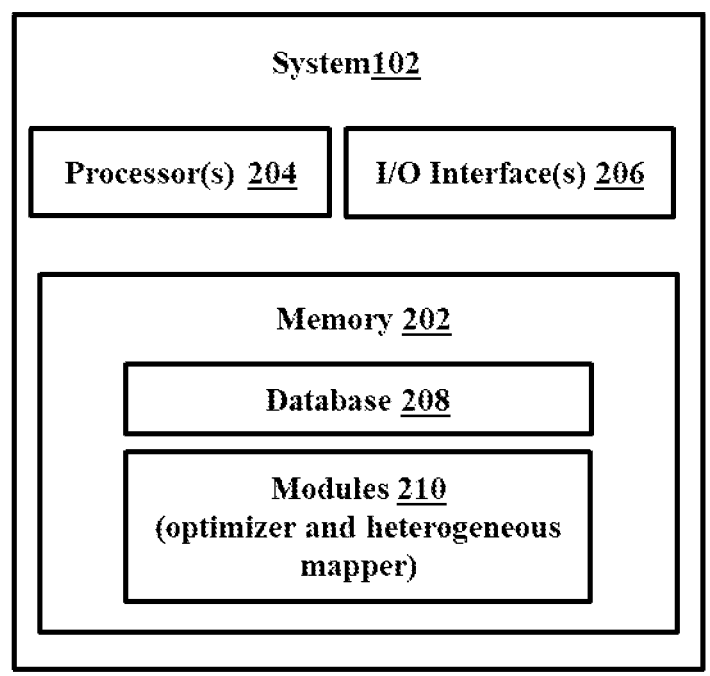
FIG. 2 is a functional block diagram of the system, also referred to as HeteroRec, for optimal deployment of embeddings tables across heterogeneous memory architecture for high-speed recommendations inference, in accordance with some embodiments of the present disclosure.

The RM 104 utilizes the heterogenous memory architecture 106 with FPGA-CPU combination enabling hardware acceleration for high speed recommendation or high speed inferencing. The system 102, comprises the optimizer and the heterogenous mapper as depicted in FIGS. 1 and 2, wherein the optimizer and the heterogeneous mapper control the optimal deployment of embedding tables across the heterogenous memory architecture 106 comprising the FPGA and the CPU system. The system 102 thus provides time efficient scanning for a recommendation engine 108 to derive recommendations/inference.

A memory configuration of the heterogeneous memory architecture 106 comprises a first level memory and a second level memory of the FPGA accelerator, and a CPU memory type of the CPU system. For each memory type the memory configuration specifies capacity in terms of number of memory units, and a width and a size of each memory unit available in each memory type. It can be understood that memory unit herein interchangeably refers to banks. For example: HBM, one type of second level memory, has a total of 8 GB space with 32 banks with each bank of size 256 MB and bus width of 32B. The CPU system with the CPU memory type supports both serial and parallel instruction processing (through multi-core configurations) but are limited by the number of CPU cores and huge latency overheads due to process switching. Modern CPUs can leverage SIMD (single Instruction Multiple Data) parallelism to improve throughput for larger batches.

The first level memory comprises of Block Random Access Memory (BRAM) and an Ultra Random Access Memory (URAM), and the second level memory comprises High Bandwidth Memory (HBM) and Dual-Data Rate (DDR) memory. As well known in the art the CPU memory type comprises of mainly three levels of memory hierarchy in the order of decreasing speed namely: cache memory with a storage capacity of few Megabytes, DDR memory (as depicted in FIG. 1) with up to few hundreds of Gigabytes of storage capacity at high end servers and Solid-State Drives (SSDs) that can store up to a few Terabytes of data. FPGAs are known to support deep pipelines owing to its data path based compute paradigm. FPGA device is the programmable silicon that realizes the desired functionality. This entails a matrix of logic blocks (Look-up table (LUT) arrays, Block RAMs (BRAM), Ultra RAMs (URAMs), Digital Signal Processors (DSPs), Flip-flops (FFs)) connected through programmable interconnects and I/Os.

Figure 4:
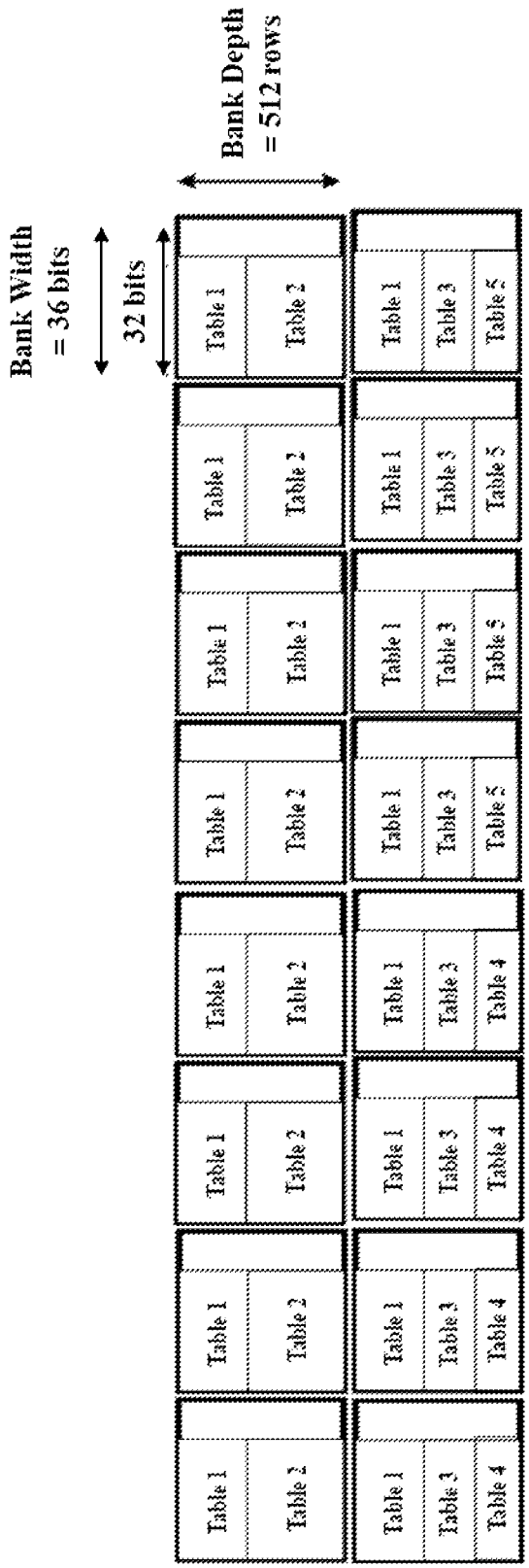
FIG. 4 is an example embedding distribution over 16 banks of Block RAM (BRAM), in accordance with some embodiments of the present disclosure.

In one implementation, the RM model 104 herein utilizes FPGA with Alveo U280™ datacenter, which contains 9 k+ DSPs, 2607K registers, MB on-chip SRAM (URAM+ BRAM), 16 GB DDR, and 8 GB HBM (High-Bandwidth Memory). These FPGA memories can be partitioned, and each partition can be accessed randomly in parallel (as shown in FIG. 4 for BRAM) as opposed to streamlined memory accesses in Graphics processing units (GPU's) HBM. FIG. 4 is an example embedding distribution over 16 banks of BRAM, in accordance with some embodiments of the present disclosure. BRAMs could be partitioned into 4032 banks with 18 Kb capacity each and URAMs up to 960 banks with 36 KB each which favors parallel lookups. Furthermore, 34 parallel lookups are supported from 32-port HBM banks (256 MB/bank) and 2-port DDR DRAM banks (8 GB/bank). The average latency of different memory architecture to fetch first set of bytes of data is tabulated in T-1 below.

| T-1 | | | | |
|---|---|---|---|---|
| | BRAM | URAM | HBM | DDR |
| Latency (in clock cycles) | 2 | 2 | 55 | 27 |
| Bits Transferred/clock | 36 B | 72 B | 32 B | 64 B |
| Total Capacity | 9 MB | 35 MB | 8 GB | 32 GB |

The HBM and DDR fetch data in the multiples of 32 and 64 bytes per bank, respectively and would take an average access latency of 63 (56+7) and 31 (28+3) cycles, respectively to fetch a 64-dimension floating-point (FP32) vector. For HBM, it is around 315 ns @200 MHz clock frequency as compared to an average measured latency of 16 μs on a high end CPU server to fetch the same amount of random data. The BRAM and URAM support single-cycle access of 36b and 72b, respectively. On the Alveo U280™ card, one can fetch up to 34 embedding tables (from 32+2=34 different banks) in parallel with an average initial start-up latency of 56 and 28 cycles. The availability of large and diverse re-configurable memory units generates a huge potential to accelerate memory bound models available in the literature with to high-speed random memory accesses. The CPU system supports both serial and parallel instruction processing (through multi-core configurations) but are limited by the number of CPU cores and huge latency overheads due to process switching. Modern CPUs can leverage SIMD (single Instruction Multiple Data) parallelism to improve throughput for larger batches.

The system 102, enhances performance of the RM 104 with optimal deployment of embedding tables across the memory types by dynamically partitioning and organizing embedding tables across fast memory architectures to reduce access time for embedding tables. The partitions are chosen to take advantage of the past input access patterns of those tables to ensure that frequently accessed data is available in the fast memory most of the time. The partition and replication is used to co-optimize memory access time and resources. The dynamic organization of embedding tables changes location of embedding, hence needs an efficient mechanism to track if a required embedding is present in the fast memory with its current address for faster look-up. Thus, the method leverages spline-based learned index, Radix spline, known in the art, to ensure faster look up. Thus, the system 102 is a HeteroRec framework for optimal deployment of embedding tables of recommendation engine 108, dynamically across heterogeneous memory architecture to ensure faster access to the embedding needed during an inference. The system 102 leverages specific access features of memory architecture, past access patterns, partitioning, and replication of embedding data, and learned index on the embedding data for faster access. The Optimization problem formulation to output <partition, memory type> pairs for all embedding tables across all available memory types, constraining to the capacity and features of the heterogeneous memory architecture and utilizing the history of embedding tables' access pattern. Performance model is provided to estimate access latency of embedding tables spread across heterogeneous memory.

Learned Indices Technique-Radix Spline (RS):

The array-based lookups used in accessing embedding tables are not possible as the system 102 stores only the frequently accessed items in faster memories. So, an indexing mechanism is required to handle the access. All indexing mechanisms need additional storage space for storing indices. It is essential that this storage overhead is kept to a minimum. To tackle the efficient lookup of cached indices, the system 102 utilizes a learned indices technique, known in the art, which provides minimum memory overhead with a significant reduction in search space. For different learned indices, it is observed that there is a trade-off among storage overhead, performance, and build times. Based on study, Recursive Model Index (RMI) is the best performing learned index, but Radix Spline (RS) is the most pareto optimal consuming least memory with the fastest build times for our requirements. Since the learned index would be implemented on an FPGA, the computation resources for implementing the recursive regression models used by RMI, would be costlier than the RS implementation. Radix Spline is used herein to fetch data with sorted keys by reducing the search space using spline points. It is tuned by two hyperparameters: spline error and the number of radix bits. Entire set of key-value pairs is divided into spline points (with spline error deciding, the number of values between two spline points). By setting the radix bits which are used to prefix lookup, one can narrow down the search for spline points. Radix table gives the two approximate spline points surrounding the key. Using binary search, the scope is reduced to the exact spline points surrounding the key and linear interpolation is used to get the key.

FIG. 2 is a functional block diagram of the system 102 for optimal deployment of embeddings tables across heterogeneous memory architecture 106 for high-speed recommendations inference, in accordance with some embodiments of the present disclosure. In an embodiment, the system 102 includes a processor(s) 204, communication interface device(s), alternatively referred as input/output (I/O) interface(s) 206, and one or more data storage devices or a memory 202 operatively coupled to the processor(s) 204. The system 102 with one or more hardware processors is configured to execute functions of one or more functional blocks of the system 102.

Referring to the components of system 102, in an embodiment, the processor(s) 204, can be one or more hardware processors 204. In an embodiment, the one or more hardware processors 204 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 204 are configured to fetch and execute computer-readable instructions stored in the memory 202. In an embodiment, the system 102 can be implemented in a variety of computing systems including laptop computers, notebooks, hand-held devices such as mobile phones, workstations, mainframe computers, servers, and the like. Typically, the servers with larger number of cores provide high speed operations for real time dynamically changing requirements for implementation of system 102.

The I/O interface(s) 206 can include a variety of software and hardware interfaces, for example, a web interface, a graphical user and the like and can facilitate multiple communications within a wide variety of networks N/W and protocol types, including wired networks, for example, LAN, cable, etc., and wireless networks, such as WLAN, cellular and the like. In an embodiment, the I/O interface (s) 206 can include one or more ports for connecting to a number of external devices or to another server or devices to communicate the inference provided by the recommendation engine 106 to external devices or servers.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In an embodiment, the memory 202 includes a plurality of modules 210 such as the optimizer and the heterogenous mapper. Further, the plurality of modules 210 include programs or coded instructions that supplement applications or functions performed by the system 102 for executing different steps involved in the process of optimal deployment of embeddings tables across heterogeneous memory architecture 106 for high-speed recommendations inference, being performed by the system 102. The plurality of modules 210, amongst other things, can include routines, programs, objects, components, and data structures, which performs particular tasks or implement particular abstract data types. The plurality of modules 210 may also be used as, signal processor(s), node machine(s), logic circuitries, and/or any other device or component that manipulates signals based on operational instructions. Further, the plurality of modules 210 can be used by hardware, by computer-readable instructions executed by the one or more hardware processors 204, or by a combination thereof. The plurality of modules 210 can further include various sub-modules (not shown) that are used by the system 102.

Further, the memory 202 may comprise information pertaining to input(s)/output(s) of each step performed by the processor(s) 204 of the system 100 and methods of the present disclosure. Furthermore, the memory 202 includes a database 208. The database (or repository) 208 may include a plurality of abstracted piece of code for refinement and data that is processed, received, or generated as a result of the execution of the plurality of modules in the module(s) 210. The database can also store the input parameters used by the optimizer such as the memory configuration of the heterogeneous memory architecture 106, an access latency of each memory type of the heterogeneous memory architecture, (iii) a total number of tables in the RM 104, (iv) a plurality of embedding tables, (v) a Cumulative Distributive Function (CDF) depicting probability distribution of queries satisfied by caching the plurality of records from the plurality of embedding tables (vi) an input access pattern obtained from the CDF, and (vii) a table access pattern of each table from the total number of tables.

Although the database 208 is shown internal to the system 102, it will be noted that, in alternate embodiments, the database 208 can also be implemented external to the system 102, and communicatively coupled to the system 102. The data contained within such external database may be periodically updated. For example, new data may be added into the database (not shown in FIG. 2) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 102 are now explained with reference to steps in flow diagrams in FIG. 2 through FIG. 4.

FIG. 3 is a flow diagram illustrating a method 300 for optimal deployment of embeddings tables across heterogeneous memory architecture for high-speed recommendations inference, using the system of FIG. 1, in accordance with some embodiments of the present disclosure.

In an embodiment, the system 102 comprises one or more data storage devices or the memory 202 operatively coupled to the processor(s) 204 and is configured to store instructions for execution of steps of the method 300 by the processor(s) or one or more hardware processors 204. The steps of the method 300 of the present disclosure will now be explained with reference to the components or blocks of the system 102 as depicted in FIG. 1, 2 and the steps of flow diagram as depicted in FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 300, at step 302 of the method 300, the optimizer executed by the one or more hardware processors 204 receive the plurality of input parameters comprising (i) the memory configuration of the heterogeneous memory architecture 106 as described in FIG. 1. The heterogenous memory architecture 106 comprises the first level memory and the second level memory of the FPGA architecture and the CPU memory type (CPU DDR as depicted in FIG. 1). For each memory type the memory configuration specifies capacity in terms of number of memory units, and a width and a size of each memory unit available in each memory type, (ii) the access latency of each memory type of the heterogeneous memory architecture providing information on number of clock cycles to wait before receiving 1st set of bytes from the memory, (iii) the total number of tables in the Recommendation Model (RM) 104 that depends from model to model, (iv) a plurality of embedding tables with different record size, (v) the CDF depicting probability distribution of queries satisfied by caching a plurality of records from the plurality of embedding tables, (vi) input access pattern obtained from the CDF, and (vii) the table access pattern of each table from the total number of tables depicting number of access required from each table per inference.

Obtaining Input Access Pattern:

Study shows that in a real-world scenario, very few records (hot embeddings) contribute to majority of the input queries (or total user arrivals) that can be cached to achieve high performance. In line with above observation, the input access pattern for example datasets such as Taobao dataset, Avazu dataset and the like are observed. To get the probability (or input pattern—$G(X_{ij})$) of queries satisfied by number of records from $i^{th}$ embedding table stored in up to $(j)^{th}$ cache from the CDF ($C(X_{ij})$) of a dataset, equation 1 below is used. The, CDF ($C(X_{ij})$ is obtained for a dataset of interest from corresponding graphs for the dataset depicting Number of queries satisfied by N records in the table. In one implementation the assumption used is j=1 for (either BRAM or URAM) as the one of the sub-types in first level memory of FPGA used for caching, j=2 for FPGA's HBM and DDR combined (second level memory of FPGA), and j=3 for CPU memory type. Here, the HBM and DDR of FPGA are treated as a single memory type (second level memory) with 34 banks. (32 HBM banks+2 DDR banks).

$$G(X_{ij}) = C(\Sigma_{q=1}^{j} X_{iq}) - C(\Sigma_{q=1}^{j-1} X_{iq}) \forall j > 1 \quad (1)$$

Parameters Used in the Equations and Corresponding Description is Provided Below:

$X_{ij}$ #Records to cache in $j^{th}$ memory from the embedding table
i Table Number (Iterator)
j Cache Number (Iterator)
(1—one of the sub-types in first level memory of FPGA used for caching, 2—HBM/DDR, 3—CPU DDR)
$m_i$ Total number of records in ith table
n Total number of embedding tables
k Total number of caches $V_i$ Record Size for $i^{th}$ table
$S_j$ Total size of jth memory
$a_i$ Number of accesses required from $i^{th}$ table for 1 inference
$C(X_{ij})$ CDF of the embedding table for records sorted according to popularity
$G(X_{ij})$ Percentage of queries resolved by caching X number of records from
$i^{th}$ table in $j^{th}$ cache
$b_j$ Number of banks in $j^{th}$ memory
$H_j$ Latency of the $j^{th}$ memory (Assumed 150 clock cycles for CPU ($H_3$) for modelling purpose The observations above teach to cache the most frequent records on the fastest memory dynamically. The on-chip memories have the lowest latency followed by the FPGA's HBM/DDR (second level memory). The remaining least popular records could reside on CPU memory saving FPGA's memories. The average serial latency of an $i^{th}$ table residing on various memory types can be given by $\Sigma_{j=1}^{k} (a_i * G(X_{ij}) * H_j)$.

For, i such tables, equation 2 provides the overall average serial latency (ASL):

$$ASL(X,H,a) = \Sigma_{i=1}^{n} (\Sigma_{j=1}^{k} (a_i * G(X_{ij}) * H_j)) \quad (2)$$

Once all input parameters are received, then at step 304 of the method 300, the optimizer executed by the one or more hardware processors 104 obtains (i) an estimated memory utilization of the first level memory and the second level memory of FPGA accelerator during inferencing by the recommendation engine 108, and (ii) a latency model, also referred to as Average Parallel Latency (APL), of the first level memory and the second level memory of FPGA accelerator.

(i) Estimating memory utilization: This includes two components: (i) estimated memory utilization for number of records cached in the first level memory and the second level memory. estimated memory utilization for number of records cached in the first level memory and the second level memory using, $X_{i1} * V_i * 4$ Bytes (for first level memory) and $X_{i2} * V_i * 4$ Bytes(for second level memory), and (ii) estimated memory utilization (U) (as stated in equation 3) for a plurality of parameters of the learned indices technique stored in one of (i) memory sub-type not used for caching embeddings in the first level memory, and (ii) used for addressing records cached in the first level memory and the second level memory. Thus, the first level memory is divided into two subtypes, where on sub-type is used for caching and one subtype is not used for caching.

The system 102 utilizes the Radix Spline (RS) approach for learned index implementation for advantages mentioned earlier, wherein Radix Spline appears to be the most effective in terms of space utilization with respect to the reduction in retrieval time. Radix Spline uses binary search to reduce the search space at the last level. To know whether an embedding vector is cached or not, its existence is verified by binary searching the keys. For HBM and DDR (second level memory), each step of the binary search would entail a round trip (RT). Thus, to increase the speed of this last level search in RS, all keys for HBM and DDR are stored in an index table in first level memory. When the popular embedding records are extracted based on a final partition information by the heterogeneous mapper, these are stored in the sorted order according to their index key. To get the location of a cached item, it is needed to access 2 tables—Radix table and the spline table. Index table would be required for HBM/DDR caches for the reason stated above, whereas all memory structures (first level memory and second level memory) would be allocated a radix table and a spline table for each of the embedding tables cached. The radix table stores few of the spline points based on the 'r' significant bits of the key to reduce the scope of search to a specific range of spline points, whereas the spline table stores all the spline points based on the pre-defined spline error (sp_err). A query for the kth key would be searched in the radix table based on r prefix bits. Then, the two spline points surrounding the key would be binary searched followed by a linear interpolation between those two pints to obtain an estimated position of the key.

The key, if present in cache, could be fetched to retrieve the index in fixed time within sp_err keys surrounding the estimated position. The time taken to search through the radix spline can be hidden by pipelining the index retrieval with the embedding retrieval of previous index for continuous embedding lookups. One of the literature study *Benchmarking Learned Indexes. Proc. VLDB Endow.* 14, 1 (sep 2020), 1-13, by Ryan Marcus et. al mentions that hat 4 MB of memory is Pareto-optimal for Radix spline (Radix+Spline table) for a dataset of 200 million unsigned integer keys. Based on this, the optimizer of the system 102 linearly interpolate that 0.02B of memory would be utilized for every key cached in the radix table. For an index table, which maintains indices of cached records, each key would use $\lceil \log_2(X) \rceil$ bits (address bus width) and hence, the total memory utilized to store X keys in an index table would be $X * \lceil \log_2(X) \rceil$ bits. Thus, the overall memory consumed by the radix, spline and index table can be given by the U in equation 3. Here, $X_{i2}$ denotes number of records of ith table stored in HBM/DDR and $X_{i1}$ denotes number of records of $i^{th}$ table stored in (first level memory).

$$U=\Sigma_{i=1}^{n}(X_{i2}*\lceil \log_2(X_{i2})\rceil+0.02*X_{i2}+0.02*X_{i1}) \quad (3)$$

(ii) Obtaining Latency model (APL): The latency model for each memory type is obtained using the CDF, the input access pattern, the table access pattern, the access latency of each memory type, a replication factor indicating number of times a record among the plurality of records is replicated in the first level memory and the second level memory for multiple parallel access an initial partition information comprising <table partition, memory type> indicating number of records from each of the plurality of embedding tables being cached in each memory type, and a number of round trips (RT) to each memory unit of the second level memory. The number of round trips to each memory unit of second level memory is estimated by:
1. estimating a number of memory units consumed in the second level memory using a width and a size of the memory unit of the second level memory received in the memory configuration;
2. sorting each table partition of the partition information of the second level memory in descending order to generate the plurality of sorted table partitions; and
3. alternatively picking up a largest table partition and a smallest table partition from among the sorted table partitions and placing sequentially along the memory units of the second level memory.

At step 306 of the method 300, the optimizer executed by the one or more hardware processors 204 dynamically generates a final partition information and a final replication factor, from the latency model, the estimated memory utilization, and a plurality of constraints using an iterative process until latency described in the latency model is minimized. The plurality of constraints and the reasons they are introduced are mentioned below.
a) Ensure estimated memory utilization,
  i. for the first level memory is within an available memory capacity of first level memory received in the memory configuration.
  ii. for the second level memory is such that top k largest table partitions among a plurality of sorted table partitions generated during the estimation of round trips to each memory unit of the second level memory is within the capacity of a largest memory sub-type (DDR with 2 units with 16 GB each) with k memory units in the second level memory.
  iii. for the second level memory such that, non-top k largest table partitions among the plurality of sorted table partitions are within the capacity of memories other than the largest memory sub-type (HBM with 32 units with 256 MB each) in the second level memory.
b) Restrict the number of round trips to each memory unit of the first level memory to 'one' to avoid partition of multiple embedding tables on a single memory unit among a plurality of memory units within the first level memory. Dual port nature of SRAMs allows two simultaneous reads from the same bank. But system 102 avoids placing multiple tables on a single bank of first level memory, because it would cause fragmentation issues which results in waste of memory. Here, tables vary in terms of width (dimension of individual embedding vector) as well as in terms of total records in each table. To illustrate the point above, in FIG. 4, say, Table 1 (has 112 records) with embedding vector$\in R^{16}$, and Table 2 (400 records) with embedding vector$\in R^{8}$, would take 16 and 8 BRAM banks, respectively. They completely fill up first 8 banks. Now, 400 empty rows in each of the remaining 8 banks could fit a lot of combinations. If last eight banks are looked into, a combination of Table 3, Table 4 and Table 5 are stored. Here, Table $3 \in R^8$, Table $4 \in R^4$, and Table $5 \in R^4$. For larger number of tables many such combination could arise. To avoid multiple tables in a bank, the optimizer of the system 102 obtains an estimated first level memory banks (Est_Banks$_{Bi}$) for each table given by Equation 4 and then, limiting the overall estimated first level memory banks used for caching (Est_Banks$_B$=$\Sigma_{i=1}^{n}$Est_Banks$_{Bi}$) to less or equal total units/banks available in first level memory banks used for caching (e.g. 960 banks if URAM (first level memory) is used for caching else 4032 BRAM banks). By doing so, the optimizer of system 102 ensures that only one table is stored in each of the banks with some wastage of rows per bank.

$$Est\_Banks_{Bi}=(V_i*32/W_{BW})*\lceil X_{i1}/W_{BD}\rceil \quad (4)$$

where $\lceil x \rceil$ is the ceiling of x. Here 32 corresponds to 32 bits in floating point (FP32) number and $W_{BW}$ and $W_{BD}$ corresponds to the width and depth of the first level's unit used for caching, respectively.
c) Restrict estimated memory utilization by the learned indices technique is within the capacity of the one of the sub-types not used for caching embeddings in the first level memory. Thus, memory utilized by the learned indices technique should be less than the total space available on one of the sub-types not used for caching embeddings in the first level memory.
d) Ensure non-cached records are pushed to the CPU memory.
e) The overall caching should not exceed the total memory, comprising the first level memory and the second level memory, available on FPGA (one of the sub-types of $1^{st}$ level of memory used for caching+HBM+DDR). Here, the memory available on registers is ignored as they would be required to store retrieved and concatenated vectors temporarily.

Step 304 and step 306 are explained below by explaining modelling an optimization problem with objective to minimize the latency under the plurality of constraints described by the latency model: To minimum minimize average latency, initially attempt is made to minimize the Average Serial Latency (ASL) given by equation 2, however equation 2 is modified to equation 5 to capture Average Parallel latency (APL) for reasons as explained below since many embedding vectors could be retrieved simultaneously using multiple memory units available in each memory type.

Until now, the concept of Average Serial Latency (ASL) to model the access latency of embedding vectors is used. Due to availability of large number of banks in first level memory and the second level memory on FPGA, many embedding vectors could be retrieved in parallel and hence, their overall latency (referred to as 'Average Parallel Latency') is given by the equation 5. APL would be limited by the maximum round trips (RT$_{j=2}$) to the HBM/DDR (second level memory). For the first level memory, it is ensured the RT to be one (Est_Banks$_{j=1}$=1) by capping the Est_Banks$_B$ to 960.

$$APL=(\Sigma_{j=1}^{k-1}((L_j-L_{j-1})*RT_j^*(H_j))) \quad (5)$$

$$\text{where, } (L_j=\Pi_{i=1}^n(a_i/r_{ij}*C(\Sigma_{q=1}^j X_{iq})^{a_i}) \text{ and } r_{ij=}a_i \quad (6)$$

Here, $L_j$ represents the probability of finding the embeddings by scanning all caches up to $j^{th}$ cache, Π Product of terms and $L_0$=1. Here, a replication parameter $r_{ij}$ is introduced, i.e., r replications of $i^{th}$ partition on $j^{th}$ cache (or memory). This is because, in some models in the literature like Deep learning recommendation model (DLRM), each table is accessed around four times and total number of tables is around 8~12. This gives the option to replicate those tables four times to avoid RT>1. Another benefit of replication is that: for smaller models, say a batch of 512 products could be scanned meeting the SLA constraint. Now, without replication one would expect 512 set of embedding fetches for that query (or user arrival). But with a replication factor of say four, at one go, a set of four embedding fetches could be performed and scope of increasing the batch size at a given SLA increases, improving the overall inference quality, as well understood in the art. For the first level memory, the replication factor is fixed to 1 (i.e., $r_{i1}$=1, ∀i), since, the first level memory has lower latencies and lower capacities, thereby rewarding serial access instead of replication.

Like estimated banks for (first level memory), an estimated number of banks (Est_Banks$_H$) for HBM/DDR (second level memory), is given by Equation 7.

$$Est\_Banks_H=\Sigma_{i=1}^n Estst\_Banks_{Hi}=\Sigma_{i=1}^n\lceil X_{i2}*V_i*4/P_2\rceil \quad (7)$$

Here, $P_2$ denotes min (the size of HBM bank, the size of DDR bank) in Bytes. If number of tables is greater than $b_2$ (number of banks from Table 2), then the number of round trips to HBM will be greater than one. Also, if few of the tables are very large spanning over multiple banks, then smaller tables would be accumulated in later banks increasing the RT. To avoid this, the table partitions are first sorted according to their size in descending order. Then, largest one is placed, followed by the smallest one, then second largest one and so on in a sequential manner. In HBM and DDR (second level memory), the entire embedding vectors are stored in a single bank, unlike the first level memory, where one vector is stored across multiple banks. This makes it easy to get the address offset and to pack multiple table partitions on a single bank. The algorithm to distribute the table partitions and calculate the $RT_{j=2}$ is as given by Algorithm 1. The minimum number of RT possible with n tables is $RT_{min}=\lceil n/b_2\rceil$.

---

Algorithm 1: Distributing partitions on HBM/DDR and calculating $RT_{j-2}$

---

Inputs: Est_bank$_H$ : Estimated banks for HBM calculated as per equation 7, $X_{i,j}$ : Number of cached records of $i^{th}$ table in $j^{th}$ cache, $V_i$ : Vector size for $i^{th}$ table, $b_2$: number of banks in $2^{nd}$ cache - HBM/DDR (FPGA), n: Total number of embedding tables
Output: $RT_{j-2}$: Maximum number of round trips impacting the APL
1: Sort the partitions $X_{i2}$ in the descending order of their size
2: if Est_bank$_H$ < $b_2$ then
3: $RT_{j-2}$ ←1
4: else
5: i=0, bank=0
6: RTT[b2] = {1,1,1,...,1}
7: while ((space_left<=0)&&(bank!=b2−1) || (i!=n/2)) do
8: space_left = b2 − X[i][2]*V[i]*4 # In Bytes

---

Algorithm 1: Distributing partitions on HBM/DDR and calculating $RT_{j-2}$

---

9: if (space_left<=0) then # Checks if partition of table i fills the current Bank
10: X[i][2] = ceil( (−1)*space_left/(4*V[i]))
11: bank++ # Move to next bank
12: else
13: i = (i <= floor(n/2)) ? n−(i+1) : n−i # Selects (largest−>smallest−>2nd largest..) partition
14: RT[bank]++ # Increase RT if extra partition added to the bank
15: end if
16: end while
17: RT$_{j-2}$ ←largest element in vector RT
18: end if

---

Thus, at step 308 of the method 300, the heterogenous mapper executed by the one or more hardware processors 204 dynamically maps each table partition of the final partition information to one of the first level memory and the second level memory on receiving a shuffle signal triggered due to change in the input access pattern as a result of rush evening hour, ongoing sales, season changes and the like. The mapping defines an approach to cache the plurality of records into the first level memory and the second level memory The mapping comprises:

a) each table partition of the final partition information to a memory unit of the first level memory using final replication factor of first level memory, an embedding record dimension of each of the plurality of embedding tables, a width, and a size of the memory unit of the first level memory received in the memory configuration, wherein the width refers to number of bits that can be stored in a single row of memory unit of the first level memory, and b) each table partition of the final partition information to a memory unit of the second level memory based on the final replication factor of the second level memory and round trips to each memory unit of the second level memory.

Formulating the Optimization Problem:

In Algorithm 2, constraint2 and constraint 3 are used to ensure that more space is provided to cache top 'RTmin' partitions in DDR (32 GB) and the rest fit in HBM (8 GB). This also ensures, not too many partitions are being put into a single bank. For this purpose, the embedding partition Xi2 are sorted in descending order of their size. Constraint 5 is used to push the remaining data that are not yet cached onto the last level of cache. The overall Average Latency (OAL) for the RM 104 can be obtained by Equation 8. Here, APL (equation 5) is applied smaller memory type in the first level memory and the second level memory, whereas ASL (removing other memories in equation 2) for sequential access on CPU DDR (CPU memory type).

$$OAL=APL+\Sigma_{i=1}^n(a_i*G(X_{ik})*H_k) \quad (8)$$

---

Algorithm 2 HeteroRec Framework

---

Inputs: n: Total number of embedding tables, k: Total number of caches (1− one of memory sub-types used for caching embeddings in the first level memory , 2-HBM/DDR, 3-CPU DDR), Vi : Vector sizes for $i^{th}$ table, $S_j$ : Total size of $j^{th}$ memory, $a_i$ : Access pattern indicating number of accesses required from $i^{th}$ table for 1 inference, $G(X_{i,j})$:
Input pattern indicating percentage of queries resolved by caching X number of records from $i^{th}$ table in $j^{th}$ cache, $m_i$ : Total number of records in $i^{th}$ table -continued Algorithm 2 HeteroRec Framework Outputs: $X_{i,j}$: Partition of $i^{th}$ table in jth cache, $r_{i,j}$ : Replication factor
1: Obtain the access pattern 'a' and the input pattern for each of the tables.
2: Minimize APL = $(\Sigma_{j-1}^{k-1}((L_j - L_{j-1}) * RT_j * (H_j)))$ with following constratints and obtain OAL ,
   i.   Constraint 1: $\Sigma_{i-1}^{n} \Sigma_{j-1}^{k}(X_{ij} * V_i * 4) < (\Sigma_{j-1}^{k} S_j)$,
   ii.  Constraint 2: $\Sigma_{i-2*RT_{min}+1}^{k}(X_{i2} * V_i * 4) < \min$ (HBMSize, DDRSize), # to avoid over-utilization of resource,
   iii. Constraint 3: $\Sigma_{i-1}^{2*RT_{min}+1}(X_{i2} * V_i * 4) < \max$ (HBMSize, DDRSize),
   iv.  Constraint 4: U ≤ Total Size available in one of memory sub-types not used for caching embeddings in the first level memory # From Equation 3,
   v.   Constraint 5: $X_{ik} = m_i \Sigma_{j-1}^{k-1}(X_{ij})$,
   vi.  Constraint 6: $\Sigma_{i-1}^{n}((V_i * 32/W_{BW}) * \lceil X_{i1}/W_{BD} \rceil) <$ Total banks available in one of memory sub-types used for caching embeddings in the first level memory # ensuring RT=1 for one of memory sub-types used for caching embeddings in the first level memory
3: Obtain Est_Banks$_{Bi}$ from Equation 4 # information on how to distribute partitions on one of memory sub-types used for caching embeddings in the first level memory
4: Run Algorithm 1 # information on how to distribute table partitions in HBM/DDR
5: Go to step 1 to dynamically change the data in cache on receiving a shuffle signal #triggered due to change in input pattern due to rush evening hour, ongoing sales, season changes).

Experiments and Results:

Experimental Setup: The different memory configurations are used in the experiment according to memory sub-system available in Alveo U280™ FPGA card connected to a host CPU with DDR memory. The URAM is considered as the first level memory (level-1) of cache with HBM/DDR to be level-2. The non-cached entries are fetched from the CPU DDR. BRAM is used for storing index and radix tables required to search items in cache. Used here is the Taobao dataset, Alimama. 2018. *Ad Display/Click Data on Taobao.com.* https://tianchi.aliyun.com/dataset/dataDetail?dataId=56&lang=en-us with 8 tables and Avazu dataset Avazu. 2015. Avazu Dataset. https://www.kaggle.com/c/avazu-ctr-prediction with 14 tables. To test algorithm 2, dimensions of the embedding vectors are set proportional to number of table entries, as also observed by works in literature, i.e., the large table (entries >106) has dimension 64 and the small table (103 entries) has dimension 4. Each entry is treated as a 32b-floating point number..

The state-of-the-art (SOA-1 and SOA-2) inference systems the MicroRec and the FleetRec respectively, report a performance speed-up on industrial Alibaba dataset which is not open-source. However, to compare performance of RM 104 due to system 103 in context of the OAL in equation 8, the MicroRec and the FleetRec frameworks' were tested for Taobao and Avazu datasets and inference latency that comes out as one round trip of HBM/DDR to fetch embedding vectors from each table is recorded. Considering 63 clock cycles (avg HBM lookup latency) for one round trip of HBM, 150 clock cycles for CPU (obtained by averaging the measured embedding lookup times over different batch sizes and embedding vector dimensions. divided by the CPU clock period). Although, replication of embedding tables is not explicitly mentioned in SOA-1 and SOA-2, both (with and without replication) variations are considered of SOAs frameworks.

Results: The results obtained by running the algorithm-2 (implemented by system 102—HeteroRec framework) on the Taobao dataset with 8 days of data, are tabulated in FIG. 5. Presented is the % of entries cached in URAM/HBM/DDR and CPU DDR for each embedding table. For instance, for table 1, 10.64% and 89.27% are cached in URAM and HBM/DDR, respectively. The remaining table (0.09%) is mapped to CPU DDR. The number of memory resources used to store cache entries is 320 URAM banks and 1 HBM/DDR banks. $100*G(X_{ij})$ represents the probability (in %) of finding an embedding vector in a particular (URAM or HBM) cache indicating the hit rate.

It is observed from table T-2 that 'RM 104 supported by system 102 (HeteroRec framework/method 300)' has better performance (up to 4.57×) than the SOA-1 and the SOA-2 inference systems for no-replication implementation and a speed-up (up to 1.52×) in replication implementation.

| | | T-2 | | | | | |
|---|---|---|---|---|---|---|---|
| | | Performance (in clock cycles) | | | | | |
| | Replication | B = 1 | B = 64 | B = 256 | B = 512 | B = 1024 | B = 2048 |
| MicroRec | No | 63 | 4032 | 16128 | 32256 | 64512 | 129024 |
| FleetRec | Y | 63 | 56.5 | 882 | 3529 | 7058 | 14116 |
| HeteroRec | Y | 56.5 | 882 | 3529 | 7058 | 14116 | 28232 |
| HeteroRec | Y | 47.6 | 583 | 2333 | 4666 | 9332 | 18664 |
| HeteroRec | Y | 33.1 | 303 | 1213 | 2425 | 4851 | 9701 |

Similar experiment with Avazu dataset which has a different access pattern gave an OAL (equation 8) of 57.5 clock cycles for batch size of 1 compared to baseline of 63 clock cycles. Furthermore, we analyzed the effect of distributing embeddings over larger resource in terms of more than one interconnected FPGAs and observed a speed-up of up to 4.4× with four FPGAs compared to baseline [SOA-1 and SOA-2] with replication.

Discussions: The results indicate method 300 implemented by the system 102 using the algorithm 2 places more embeddings on faster memories reducing the OAL and by caching a small fraction of embedding tables in a hierarchical manner, significant number (30%-99%) of embedding access requests are satisfied except in Table 1. The low hit rate of table 1 adversely affects the OAL which is 56.51 cycles with table 1 (OAL=39.83 cycles without table 1). This can be explained by the fact that for speed up, all queried embeddings (like user id, item id, category id, etc.) need to be fetched in parallel from URAM cache. The probability of fetching all embeddings is given by the product of all probabilities of queries fulfilled by table's partition present in URAM ($\Pi_{i=1}^{n} G(X_{i1})$). Even if a single embedding record from the queried set is not present in the URAM, then the record must be fetched from HBM, essentially cancelling out the speedup provided by URAM lookups. This effect reduces for larger batch sizes giving a better performance (as shown in T-2), since, for a given query, the user embedding (table 1) would be fetched only once, whereas other tables would be fetched hundreds of times depending on the batch size. Here, number of items or products scanned for Click-through rate (CTR) determines the batch size for the user.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for high-speed recommendations, the method comprising:
receiving, by an optimizer executed by one or more hardware processors, a plurality of input parameters comprising (i) a memory configuration of a heterogeneous memory architecture used by a Recommendation Model (RM) during inference, the heterogenous memory architecture comprising a first level memory and a second level memory of a Field Programmable Gate Array (FPGA) accelerator, and a CPU memory type, (ii) an access latency of each memory type of the heterogeneous memory architecture, (iii) a total number of tables in the RM, (iv) a plurality of embedding tables, (v) a Cumulative Distributive Function (CDF) depicting probability distribution of queries satisfied by caching a plurality of records from the plurality of embedding tables, (vi) an input access pattern obtained from the CDF, and (vii) a table access pattern of each table from the total number of tables;
obtaining, by the optimizer executed by the one or more hardware processors:
a) an estimated memory utilization for (i) a number of records cached in the first level memory and the second level memory, and (ii) a plurality of parameters of a learned indices technique stored in one of memory sub-types not used for caching embeddings in the first level memory used for addressing the plurality of records cached in the first level memory and the second level memory; and
b) a latency model for each memory type using the CDF, the input access pattern, the table access pattern, the access latency of each memory type, a replication factor indicating number of times a record among the plurality of records is replicated in the first level memory and the second level memory for multiple parallel access; an initial partition information (table partition, memory type) indicating number of records from each of the plurality of embedding tables being cached in each memory type, and a number of round trips to each memory unit of the second level memory;

dynamically generating, by the optimizer executed by the one or more hardware processors, a final partition information and a final replication factor, from the latency model, the estimated memory utilization, and a plurality of constraints using an iterative process until latency described in the latency model is minimized, wherein the plurality of constraints,
a) ensure estimated memory utilization,
   (i) for the first level memory is within an available memory capacity of first level memory received in the memory configuration,
   (ii) for the second level memory is such that top k largest table partitions among a plurality of sorted table partitions generated during the estimation of round trips to each memory unit of the second level memory is within the capacity of a largest memory sub-type with k memory units in the second level memory, and
   (iii) for the second level memory such that non-top k largest table partitions among the plurality of sorted table partitions are within the capacity of memories other than the largest memory sub-type in the second level memory,
b) restrict the number of round trips to each memory unit of the first level memory used for caching embeddings to 'one' to avoid partition of multiple embedding tables on a single memory unit among a plurality of memory units within the first level memory used for caching embeddings,
c) restrict estimated memory utilization by the learned indices technique is within the capacity of one of the memory sub-types not used for caching embeddings in the first level memory, and
d) ensure non-cached records are pushed to the CPU memory; and
dynamically mapping each table partition of the final partition information to one of the first level memory and the second level memory by a heterogenous mapper executed by the one or more hardware processors on receiving a shuffle signal triggered due to change in the input access pattern, wherein the mapping defines an approach to cache the plurality of records into the first level memory and the second level memory, and wherein the mapping comprises:
a) each table partition of the final partition information to a memory unit of the first level memory using final replication factor of first level memory, an embedding record dimension of each of the plurality of embedding tables, a width, and a size of the memory unit of the first level memory received in the memory configuration, wherein the width refers to number of bits that can be stored in a single row of memory unit of the first level memory, and
b) each table partition of the final partition information to a memory unit of the second level memory based on the final replication factor of the second level memory and round trips to each memory unit of the second level memory.

2. The method of claim 1, wherein the number of round trips to each memory unit of second level memory is estimated by:
estimating a number of memory units consumed in the second level memory using a width and a size of the memory unit of the second level memory received in the memory configuration;
sorting each table partition of the partition information of the second level memory in descending order to generate the plurality of sorted table partitions; and
alternatively picking up a largest table partition and a smallest table partition from among the sorted table partitions and placing sequentially along the memory units of the second level memory.

3. The method of claim 1, wherein the first level memory comprises a Block Random Access Memory (BRAM) and an Ultra Random Access Memory (URAM) and the second level memory comprises High Bandwidth Memory (HBM) and Dual-Data Rate (DDR) memory.

4. The method of claim 1, wherein the memory configuration of the heterogeneous memory architecture specifies the capacity in terms of number of units and a width and a size of each memory unit of each of the first level memory and the second level memory of the FPGA accelerator, and the CPU memory type.

5. A system for high speed recommendations, the system comprising:
a memory storing instructions;
one or more Input/Output (I/O) interfaces; and
one or more hardware processors coupled to the memory via the one or more I/O interfaces, wherein the one or more hardware processors are configured by the instructions to:
receive, by an optimizer executed by one or more hardware processors, a plurality of input parameters comprising (i) a memory configuration of a heterogeneous memory architecture used by a Recommendation Model (RM) during inference, the heterogenous memory architecture comprising a first level memory and a second level memory of a Field Programmable Gate Array (FPGA) accelerator, and a CPU memory type, (ii) an access latency of each memory type of the heterogeneous memory architecture, (iii) a total number of tables in the RM, (iv) a plurality of embedding tables, (v) a Cumulative Distributive Function (CDF) depicting probability distribution of queries satisfied by caching a plurality of records from the plurality of embedding tables, (vi) an input access pattern obtained from the CDF, and (vii) a table access pattern of each table from the total number of tables;
obtain, by the optimizer executed by the one or more hardware processors:
a) an estimated memory utilization for (i) a number of records cached in the first level memory and the second level memory, and (ii) a plurality of parameters of a learned indices technique stored in one of memory sub-types not used for caching embeddings in the first level memory used for addressing the plurality of records cached in the first level memory and the second level memory; and
b) a latency model for each memory type using the CDF, the input access pattern, the table access pattern, the access latency of each memory type, a replication factor indicating number of times a record among the plurality of records is replicated in the first level memory and the second level memory for multiple parallel access an initial partition information (table partition, memory type) indicating number of records from each of the plurality of embedding tables being cached in each memory type, and a number of round trips to each memory unit of the second level memory;

dynamically generate, by the optimizer executed by the one or more hardware processors, a final partition information and a final replication factor, from the latency model, the estimated memory utilization, and a plurality of constraints using an iterative process until latency described in the latency model is minimized, wherein the plurality of constraints,
a) ensure estimated memory utilization,
   (i) for the first level memory is within an available memory capacity of first level memory received in the memory configuration,
   (ii) for the second level memory is such that top k largest table partitions among a plurality of sorted table partitions generated during the estimation of round trips to each memory unit of the second level memory is within the capacity of a largest memory sub-type with k memory units in the second level memory, and
   (iii) for the second level memory such that non-top k largest table partitions among the plurality of sorted table partitions are within the capacity of memories other than the largest memory sub-type in the second level memory,
b) restrict the number of round trips to each memory unit of the first level memory used for caching embeddings to 'one' to avoid partition of multiple embedding tables on a single memory unit among a plurality of memory units within the first level memory used for caching embeddings,
c) restrict estimated memory utilization by the learned indices technique is within the capacity of one of the memory sub-types not used for caching embeddings in the first level memory, and
d) ensure non-cached records are pushed to the CPU memory; and
dynamically map each table partition of the final partition information to one of the first level memory and the second level memory by a heterogenous mapper executed by the one or more hardware processors on receiving a shuffle signal triggered due to change in the input access pattern, wherein the mapping defines an approach to cache the plurality of records into the first level memory and the second level memory, and wherein the mapping comprises:
a) each table partition of the final partition information to a memory unit of the first level memory using final replication factor of first level memory, an embedding record dimension of each of the plurality of embedding tables, a width, and a size of the memory unit of the first level memory received in the memory configuration, wherein the width refers to number of bits that can be stored in a single row of memory unit of the first level memory, and
b) each table partition of the final partition information to a memory unit of the second level memory based on the final replication factor of the second level memory and round trips to each memory unit of the second level memory.

6. The system of claim 5, wherein the one or more hardware processors are configured to estimate the number of round trips to each memory unit of second level memory by:
estimating a number of memory units consumed in the second level memory using a width and a size of the memory unit of the second level memory received in the memory configuration;
sorting each table partition of the partition information of the second level memory in descending order to generate the plurality of sorted table partitions; and
alternatively picking up a largest table partition and a smallest table partition from among the sorted table partitions and placing sequentially along the memory units of the second level memory.

7. The system of claim 5, wherein the first level memory comprises a Block Random Access Memory (BRAM) and an Ultra Random Access Memory (URAM) and the second level memory comprises High Bandwidth Memory (HBM) and Dual-Data Rate (DDR) memory.

8. The system of claim 5, wherein the memory configuration of the heterogeneous memory architecture specifies the capacity in terms of number of units and a width and a size of each memory unit of each of the first level memory and the second level memory of the FPGA accelerator, and the CPU memory type.

9. One or more non-transitory machine-readable information storage mediums comprising one or more instructions which when executed by one or more hardware processors cause:
receiving a plurality of input parameters comprising (i) a memory configuration of a heterogeneous memory architecture used by a Recommendation Model (RM) during inference, the heterogenous memory architecture comprising a first level memory and a second level memory of a Field Programmable Gate Array (FPGA) accelerator, and a CPU memory type, (ii) an access latency of each memory type of the heterogeneous memory architecture, (iii) a total number of tables in the RM, (iv) a plurality of embedding tables, (v) a Cumulative Distributive Function (CDF) depicting probability distribution of queries satisfied by caching a plurality of records from the plurality of embedding tables, (vi) an input access pattern obtained from the CDF, and (vii) a table access pattern of each table from the total number of tables;
obtaining by the optimizer:
a) an estimated memory utilization for (i) a number of records cached in the first level memory and the second level memory, and (ii) a plurality of parameters of a learned indices technique stored in one of memory sub-types not used for caching embeddings in the first level memory used for addressing the plurality of records cached in the first level memory and the second level memory; and
b) a latency model for each memory type using the CDF, the input access pattern, the table access pattern, the access latency of each memory type, a replication factor indicating number of times a record among the plurality of records is replicated in the first level memory and the second level memory for multiple parallel access, an initial partition information (table partition, memory type) indicating number of records from each of the plurality of embedding tables being cached in each memory type, and a number of round trips to each memory unit of the second level memory;
dynamically generating a final partition information and a final replication factor, from the latency model, the estimated memory utilization, and a plurality of constraints using an iterative process until latency described in the latency model is minimized, wherein the plurality of constraints, a) ensure estimated memory utilization,
   (i) for the first level memory is within an available memory capacity of first level memory received in the memory configuration,
   (ii) for the second level memory is such that top k largest table partitions among a plurality of sorted table partitions generated during the estimation of round trips to each memory unit of the second level memory is within the capacity of a largest memory sub-type with k memory units in the second level memory, and
   (iii) for the second level memory such that non-top k largest table partitions among the plurality of sorted table partitions are within the capacity of memories other than the largest memory sub-type in the second level memory,
b) restrict the number of round trips to each memory unit of the first level memory used for caching embeddings to 'one' to avoid partition of multiple embedding tables on a single memory unit among a plurality of memory units within the first level memory used for caching embeddings,
c) restrict estimated memory utilization by the learned indices technique is within the capacity of one of the memory sub-types not used for caching embeddings in the first level memory, and
d) ensure non-cached records are pushed to the CPU memory; and dynamically mapping each table partition of the final partition information to one of the first level memory and the second level memory by a heterogenous mapper executed by the one or more hardware processors on receiving a shuffle signal triggered due to change in the input access pattern, wherein the mapping defines an approach to cache the plurality of records into the first level memory and the second level memory, and wherein the mapping comprises:

a) each table partition of the final partition information to a memory unit of the first level memory using final replication factor of first level memory, an embedding record dimension of each of the plurality of embedding tables, a width, and a size of the memory unit of the first level memory received in the memory configuration, wherein the width refers to number of bits that can be stored in a single row of memory unit of the first level memory, and b) each table partition of the final partition information to a memory unit of the second level memory based on the final replication factor of the second level memory and round trips to each memory unit of the second level memory.

10. The one or more non-transitory machine readable information storage mediums of claim 9, wherein the number of round trips to each memory unit of second level memory is estimated by:
   estimating a number of memory units consumed in the second level memory using a width and a size of the memory unit of the second level memory received in the memory configuration;
   sorting each table partition of the partition information of the second level memory in descending order to generate the plurality of sorted table partitions; and
   alternatively picking up a largest table partition and a smallest table partition from among the sorted table partitions and placing sequentially along the memory units of the second level memory.

11. The one or more non-transitory machine readable information storage mediums of claim 9, wherein the first level memory comprises a Block Random Access Memory (BRAM) and an Ultra Random Access Memory (URAM) and the second level memory comprises High Bandwidth Memory (HBM) and Dual-Data Rate (DDR) memory.

12. The one or more non-transitory machine readable information storage mediums of claim 9, wherein the memory configuration of the heterogeneous memory architecture specifies the capacity in terms of number of units and a width and a size of each memory unit of each of the first level memory and the second level memory of the FPGA accelerator, and the CPU memory type.

\* \* \* \* \*